United States Patent
Katayama et al.

(10) Patent No.: US 6,879,329 B2
(45) Date of Patent: Apr. 12, 2005

(54) IMAGE PROCESSING APPARATUS HAVING PROCESSING OPERATION BY COORDINATE CALCULATION

(75) Inventors: Osamu Katayama, Nagoya (JP); Hiroshi Uesugi, Nagoya (JP)

(73) Assignee: Denso Corporation, Kariya (JP)

( * ) Notice: Subject to any disclaimer, the term of this patent is extended or adjusted under 35 U.S.C. 154(b) by 232 days.

(21) Appl. No.: 10/214,165

(22) Filed: Aug. 8, 2002

(65) Prior Publication Data

US 2003/0044082 A1 Mar. 6, 2003

(30) Foreign Application Priority Data

Aug. 30, 2001 (JP) ........................................ 2001-261645

(51) Int. Cl.[7] .............................................. G09G 5/00
(52) U.S. Cl. ...................... 345/629; 345/611; 345/599; 345/643; 345/606; 345/592; 345/626
(58) Field of Search ............................... 345/629, 611, 345/599, 643, 606, 592, 626

(56) References Cited

U.S. PATENT DOCUMENTS

| | | | | |
|---|---|---|---|---|
| 5,487,142 A | * | 1/1996 | Nakayama et al. | ......... 345/443 |
| 5,852,672 A | * | 12/1998 | Lu | ............................ 382/154 |
| 6,166,748 A | * | 12/2000 | Van Hook et al. | .......... 345/522 |
| 6,392,655 B1 | * | 5/2002 | Migdal et al. | ............... 345/582 |
| 6,456,339 B1 | * | 9/2002 | Surati et al. | ................. 348/745 |
| 6,664,971 B1 | * | 12/2003 | Mukherjee et al. | ......... 345/582 |
| 6,665,001 B1 | * | 12/2003 | Yoshikawa | ............... 348/14.12 |

FOREIGN PATENT DOCUMENTS

| | | |
|---|---|---|
| JP | A-4-81790 | 3/1992 |
| JP | A-04-140792 | 5/1992 |
| JP | A-6-175643 | 6/1994 |
| JP | A-8-16102 | 1/1996 |
| JP | A-10-340273 | 12/1998 |
| JP | A-200-305541 | 11/2000 |
| JP | A-2001-67457 | 3/2001 |

* cited by examiner

*Primary Examiner*—Matthew C. Bella
*Assistant Examiner*—Mike Rahmjoo
(74) *Attorney, Agent, or Firm*—Posz Law Group, PLC

(57) ABSTRACT

An image processing apparatus draws an image, stores the drawn image in a memory, reads image data from the memory along a raster direction, and executes a processing operation required for a display with respect to the read image data to output the processed image data to a display device. A display processing unit executes a processing operation including a coordinate calculation with respect to the image data read out along the raster direction. As a result, the image can be formed at high speed even under transition state of displayed images.

27 Claims, 5 Drawing Sheets

FIG. 2A
ORIGINAL

FIG. 2B
t_buf=2

FIG. 2C
t_buf=6

FIG. 4A
ORIGINAL

FIG. 4B
SIMPLE THINNING

FIG. 4C
ADAPTIVE THINNING

FIG. 5

IMAGE PROCESSING APPARATUS HAVING PROCESSING OPERATION BY COORDINATE CALCULATION

CROSS REFERENCE TO RELATED APPLICATION

This application is based on and incorporates herein by reference Japanese Patent Application No. 2001-261645 filed on Aug. 30, 2001.

FIELD OF THE INVENTION

The present invention generally relates to an image processing apparatus for executing a processing operation capable of drawing an image and of displaying the image on a display device. More specifically, the present invention is directed to a technique capable of displaying a pictorial image at high speed.

BACKGROUND OF THE INVENTION

Recently, there are many cases that operation menus and the like are superimposed on pictorial images which constitute backgrounds and displayed. In order to apply high quality feelings, or high grade feelings to object images such as these menus, not only simple switching operations of displaying, or not displaying these object images are carried out, but also transition conditions must be made smooth, during which these object images are switched from being displayed and not being displayed, and vice versa. In the case that such a transition condition is formed by way of a drawing operation, since images are required to be re-drawn with respect to each of frames, lengthy time is required.

Figure 1A:
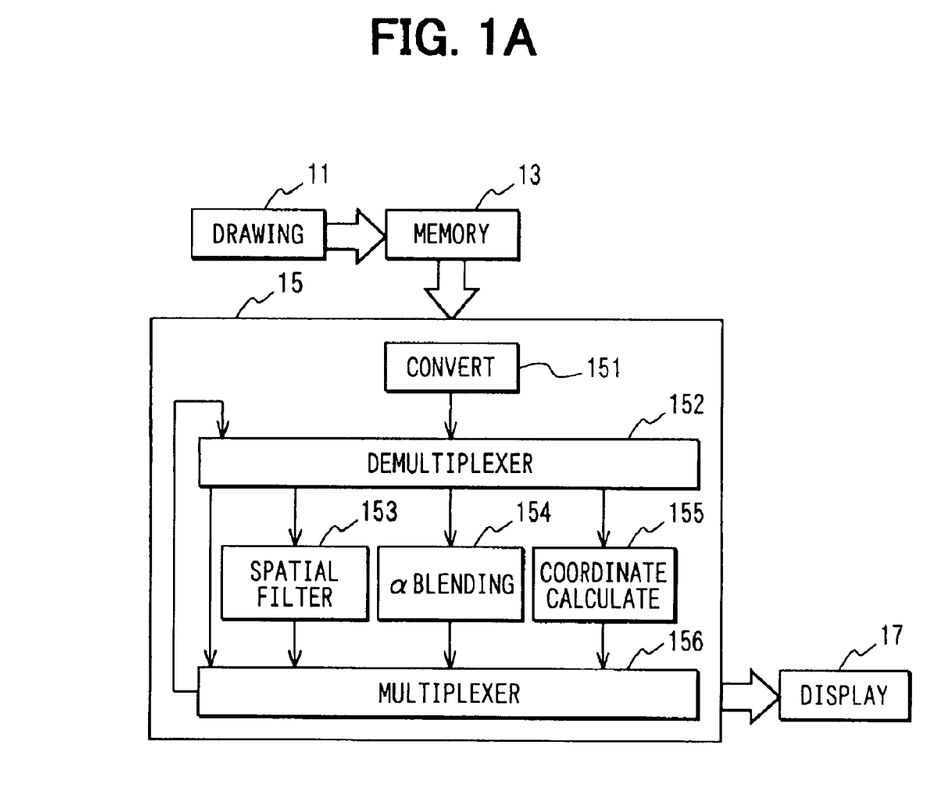
FIG. 1A is a schematic block diagram showing an image processing apparatus according to an embodiment of the present invention.
Figure 1B:
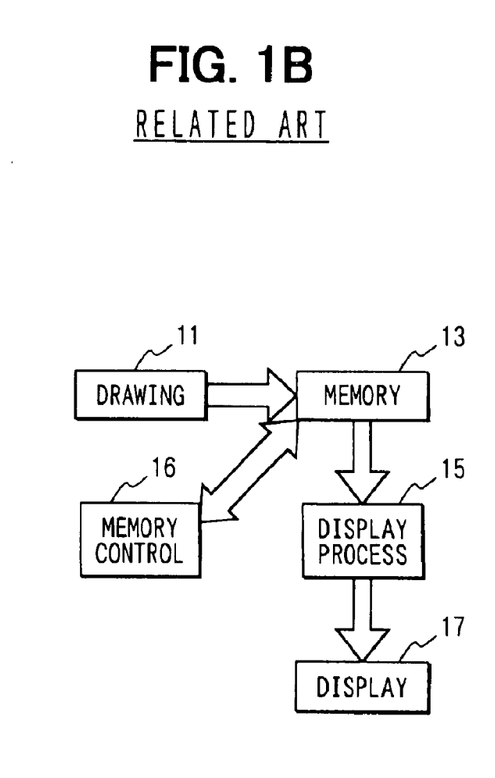
FIG. 1B is a block diagram showing an image processing apparatus according to a related art.

A processing flow operation proposed in a related art is shown in FIG. 1B. A pictorial image is drawn by a drawing process unit 11. The drawn image data is stored into a predetermined storage position of a memory 13. When an image is to be displayed, the image data is read out from a predetermined storage position of the memory by a memory control unit 16. This memory control unit 16 operates as an image processing/synthesizing unit. Then, such a processing operation as an RGB converting operation and a simple image synthesizing operation is carried out with respect to the read image data by a display processing unit 15. Thereafter, the processed image data is outputted to a display device 17 at necessary timing. While the memory 13 is constituted by, for example, a VRAM (video random access memory), the display processing unit 15 sequentially reads out the image data along the raster direction to execute the display processing operation with respect to this memory 13.

When an image to be displayed is changed, this image is re-drawn by the drawing unit 11 and then, the re-drawn image is stored in the memory 13. Then, the memory control unit 16 reads out this stored image data if required, and executes such a processing operation as the affine transformation with respect to the read image data. Thereafter, the processed image data is stored in the memory 13. In the case that an image processing technique which is typically known as the affine transformation is carried out, there are many possibilities that addresses of read pixels are different from calculated addresses. As a result, while an additional memory used to save images is separately provided, the following operation is carried out. That is, a calculation result obtained from the read pixel values is stored in a calculated address of the additional memory.

SUMMARY OF THE INVENTION

It is therefore an object of the present invention to provide an image processing apparatus capable of producing images at high speed even under such a transition condition of displayed images.

According to the present invention, an image processing apparatus draws an image, stores the drawn image in a memory, reads image data from the memory along a raster direction, and executes a processing operation required for a display with respect to the read image data to output the processed image data to a display device. A display processing unit executes a coordinate calculation operation as the processing operation with respect to the image data read out along the raster direction. As a result, the image can be formed at high speed even under transition state of displayed images.

BRIEF DESCRIPTION OF THE DRAWINGS

For a better understanding of the present invention, reference is made to a detailed description to be read in conjunction with the accompanying drawings, in which.

DETAILED DESCRIPTION OF THE PREFERRED EMBODIMENT

Referring now to FIG. 1A, an image processing apparatus of this embodiment is provided with a drawing unit 11, memory 13, and a display processing unit 15 for a display 17.

The drawing unit 11 draws image data in response to a command entered from a control apparatus (not shown), and this drawn image data is written into the memory 13. The memory 13 may be a VRAM and the like. The display processing unit 15 reads out the image data from this memory 13 along a raster direction, and performs an RGB converting operation, and executes a processing/synthesizing processing operation by the display control means, if necessary, with respect to the read image data. Its outputs with respect to the display device 17 as appropriate timing. It should also be noted that as the display device, for instance, a liquid crystal display, a plasma display, a CRT, an organic EL, and the like may be positively employed.

In this embodiment, the display processing unit 15 contains a converting unit 151, a demultiplexer 152, a spatial filter unit 153, an α blending unit 154, a coordinate calculating unit 155, and a multiplexer 153. This converting unit 151 converts image data represented by a color palette system into RGB data. The demultiplexer 152 demultiplexes an input into three sorts of processing units, that is, the spatial filter unit 153, the α blending unit 154, and the coordinate calculating unit 155. The multiplexer 153 selects outputs from these respective processing units 153, 154, and 155.

Alternatively, the demultiplexer 152 may output the demultiplexed image data to the multiplexer 153 without via these respective processing units 153, 154, and 155. Also, the display processing unit 15 is arranged in such a manner that the output selected by the multiplexer 153 is supplied to the display device, and also, is again entered into the demultiplexer 152. Furthermore, the demultiplexer 152 may be arbitrarily controlled as to how this demultiplexer 152 demultiplexes the input to which processing units 153, 154, and 155.

As a result, for instance, such an image data which has been processed by either the spatial filter (SF) unit 153 or the coordinate calculating unit 155 may be entered from the multiplexer 156 to the demultiplexer 152, and then the image synthesizing operation may be carried out by the α blending unit 154. Alternatively, this image data may be processed in a sequence opposite to the above sequence. As apparent from the foregoing description, the image data may be processed through all of these three processing units 153, 154 and 155 in an arbitrary sequence. Furthermore, the image data may be processed through the same processing units plural times.

It should be noted that both the spatial filter unit 153 and the coordinate calculating unit 155 operate to process image, and the α blending unit 154 operates to synthesize a screen.

The designations "image processing" and "image synthesizing" as used herein mean "image deforming" and "image composing", respectively.

In the case of the arrangement shown in FIG. 1B, the general-purpose image processing/synthesizing technique such as the affine transformation is carried out. In particular, when the image processing operation is carried out, there are many cases that reading addresses of a memory are different from outputting addresses of the memory. As a result, while additional memory used to save an image is separately provided, the following operation is carried out. That is, the calculation result of the read pixel value is stored at the calculated address of this additional memory.

These functions may contain a function capable of processing image data along the raster direction, and/or may be substituted by a processing operation along the raster direction in a simple manner. For example, in case that rectangular image is converted into trapezoidal shape, if image is deformed by executing affine transformation, then memory addresses must be separately calculated one by one. Alternatively, this image deformation may be substituted by simply performing longitudinal and transverse thinning operation.

In contrast, in the image processing apparatus shown in FIG. 1B, since the image data which have been read from the memory 13 along the raster direction are processed/synthesized in the display processing unit 15, the image data are not required to be again written into the memory 13. As a result, the images can be produced at high speed. For instance, while a pixel value which is located along the raster direction and is required to display an image is employed for the processing operation, only such pixel values located around this pixel value are read out from the memory 13, and then, these read pixel values are converted into RGB data in the converting unit 151. Thereafter, these RGB data are stored in a buffer memory.

The spatial filter unit 153 executes the image processing operation by using the peripheral pixel values with respect to such a pixel value to be processed. Then, in the α blending unit 154, the image-processed pixel data are synthesized with data which are not processed (for example, background image) so as to produce an output image. If the above image processing operation is carried out, then the drawing operation by the drawing unit 11 is no longer required, but also the processed image data are not again stored in the memory 13, so that the high-speed image production can be realized.

Next, the α blending processing operation is described. This α blending processing operation means that when two sets of images are synthesized with each other, a calculation is carried out by employing an α value indicative of transmittance. A formula of the α blending processing operation is given as follows:

$$Pdisp = (1-\alpha) \times Pa + \alpha \times Pb,$$

where symbol "Pdisp" indicates a pixel value to be displayed;
symbol "Pa" shows a pixel value of a plane "a";
symbol "Pb" denotes a pixel value of another plane "b"; and
symbol "α" indicates a ratio of transmittance when two sets of images are synthesized with each other.

As a consequence, in the case of α=1, only the plane "b" is displayed. In the case of α=0, only the plane "a" is displayed.

Also, in the case that a color palette system is employed, addresses of image data represented by way of the color palette system are stored in the memory 13. As a result, these address data have no correlative relationship with respect to peripheral pixel values (address data), and generally, an image cannot be processed. However, in accordance with the arrangement of this embodiment, the display processing unit 15 reads out the image data from the memory 13, and executes the RGB converting processing operation. Thereafter, the image processing operation may be applied to the RGB-converted image data. That is, the present invention may also be applied to the color palette type drawing system.

Then, in the case of this embodiment, the image processing apparatus owns only three functions of spatial filter, coordinate calculation, and α blending as the function blocks, which are represented as three processing units 153, 154, 155. The image processing apparatus uses these function blocks by combining these function blocks with each other. When the hardware structure of the display processing unit 15 is considered, an increase in the circuit area does not cause any serious problem.

It should also be understood that these functions may be independently employed. For example, an object image may be moved, and an image may be deformed by executing only the coordinate calculation. Several examples of image processing/synthesizing operations executed by the respective functions will be described as follows.

Image Processing by Coordinate Calculation Function

For instance, an image may be deformed to be similar to a wave, when it is assumed that a data position (x, y) used to read out image data from the memory by employing the coordinate calculation function is defined as follows.

$$(x', y') = x + \sin(y \times 2\pi \times t\_buf/ROW) \times y\_buf$$

In the above equation, symbol "ROW" indicates a size of an image along a longitudinal direction, symbol "y_buf" indicates a ratio of deforming the image along a transverse direction, and symbol "t_buf" indicates a ratio of deforming the image along a longitudinal direction.

Figures 2A, 2B, 2C, 2D, 2E:
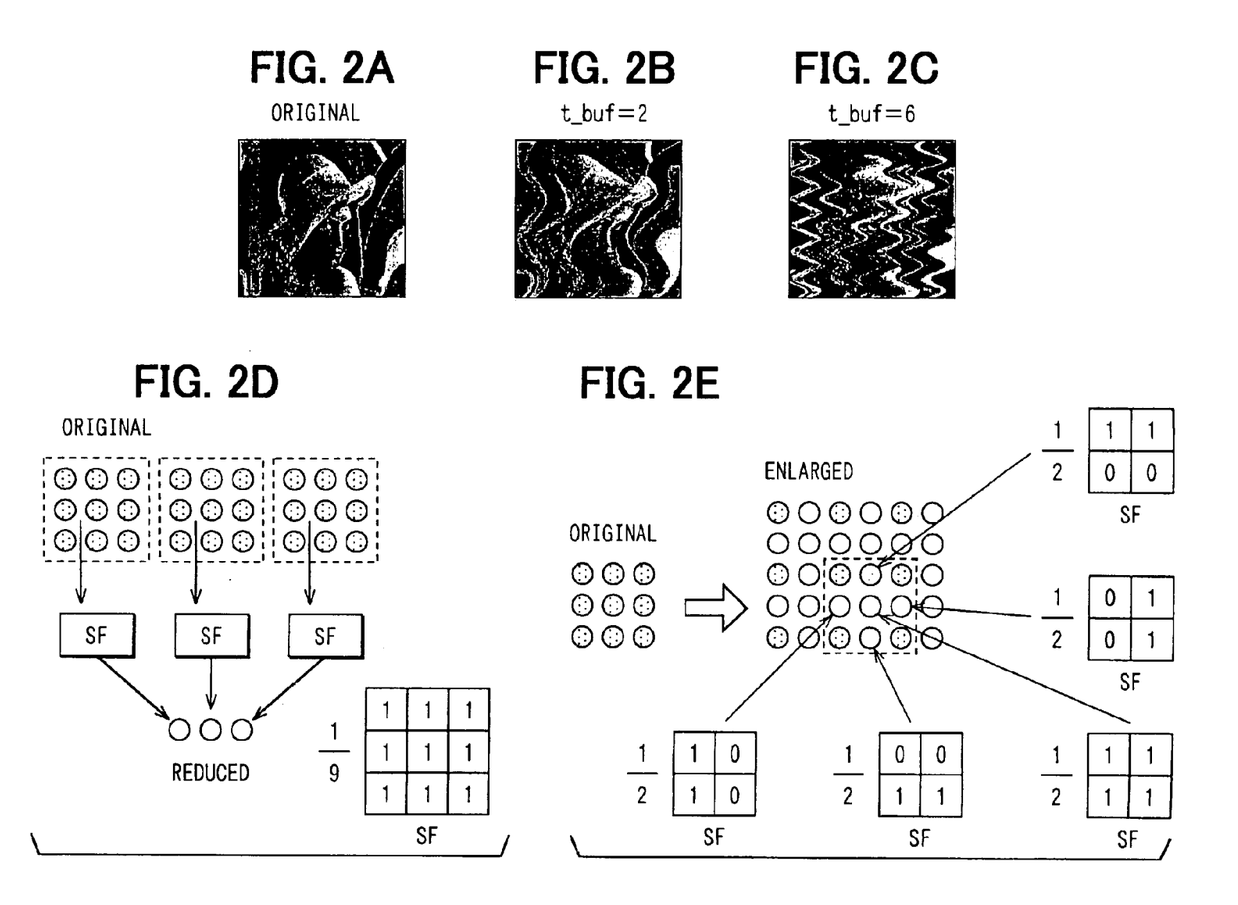
FIGS. 2A to 2C are explanatory diagrams showing display examples.
FIG. 2D is a production example of a compressed image.
FIG. 2E is a producing example of an enlarged image with employment of a coordinate calculation function realized by the image processing apparatus of the embodiment.

FIG. 2A shows an original image. FIG. 2B show an image formed in the case of t_buf=2 and y_buf=8, and FIG. 2C show an image formed in the case of t_buf=6, y_buf=8. As explained above, while the original image (FIG. 2A) is gradually deformed, if no image is displayed by combining, for instance, the blending function, then the image display may be achieved with having a high grade feeling in comparison with such an image display operation that the image is simply displayed and then not displayed.

Compression of Image

In the case that an original image is compressed, a readout position may be determined by simply employing only the coordinate calculation function so as to thin the image. Alternatively, as shown in FIG. 2D, for example, while an averaging filter may be used as the spatial filter (SF), an image which is compressed based upon the average value may be formed. In the example of FIG. 2D, the original image is compressed by ⅓.

Enlargement of Image

In the case that an original image is enlarged, the original image may be enlarged with a high image quality by properly changing a coefficient of a spatial filter. For example, FIG. 2E shows such a case that the original image is enlarged two times. A black-colored circle indicates an original pixel value, and a white-colored circuit indicates a value which is determined by way of a filtering processing operation. While a 2×2 matrix is employed as a filter, when filter coefficients as indicated in this drawing are employed with respect to values of the original image which are located in a rectangular region surrounded by a dotted line in order to determine the respective white-colored circles, then the values of the original image can be interpolated in a linear mode. Thus, a high image quality can be achieved.

Antialiasing

In an artificial image such as an animation image, there are some possibilities that a jagged edge (so-called "jagy") is produced with respect to an inclined line. As a method of correcting this "jagy", an antialiasing method is used. Normally, an area having a size two, or three times larger than a necessary area is drawn during drawing operation, and an averaged value is outputted, so that the antialiasing method is carried out. This is referred to as a "super sampling system." However, in this super sampling system, since the area larger than that of the actual case is drawn, processing time thereof is considerably increased.

Figure 3:
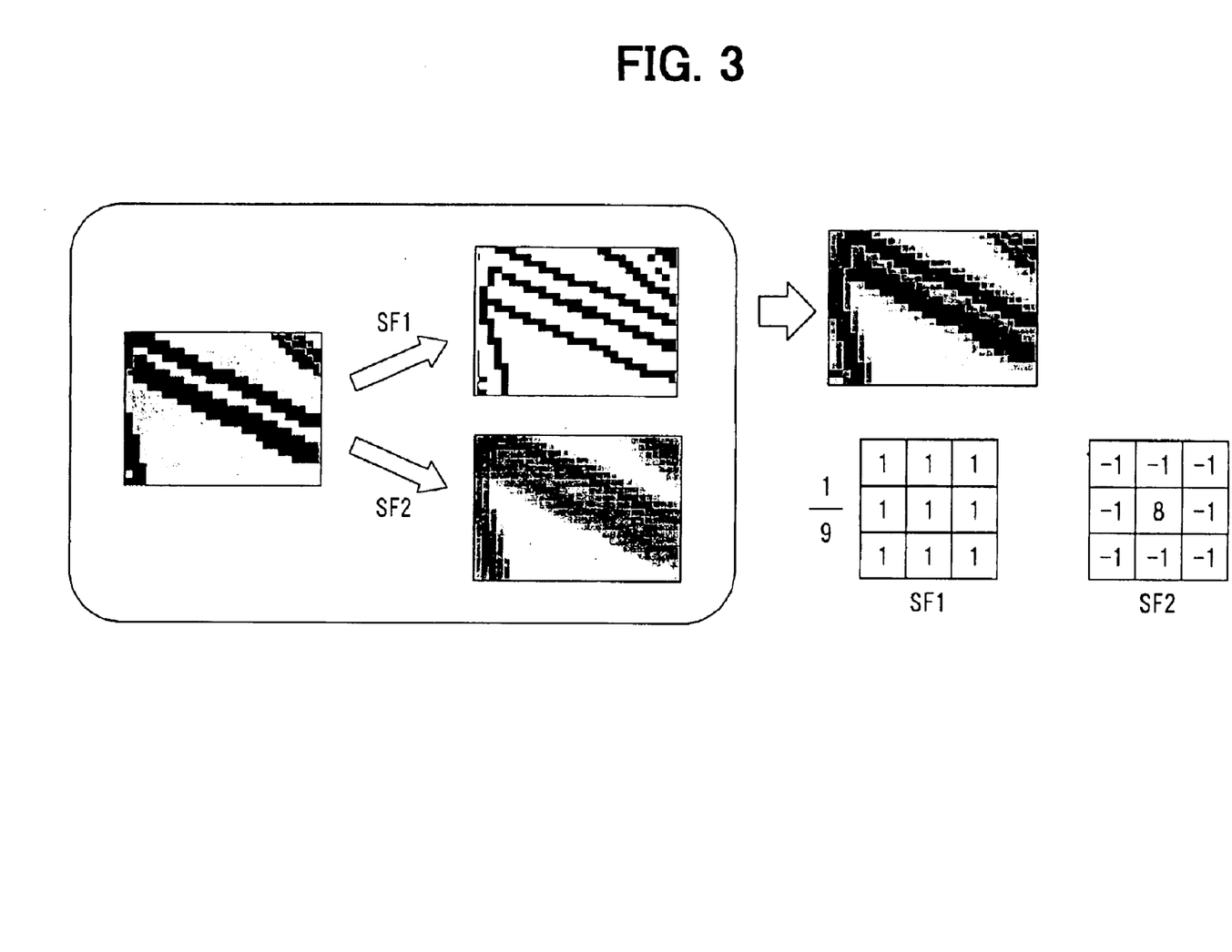
FIG. 3 is an explanatory diagram showing a production example of an untialiasing image formed by the image processing apparatus of the embodiment.

As a consequence, in this embodiment, the antialiasing method is carried out as indicated in FIG. 3. First, while a differential type filter is employed as a spatial filter 1 (SF1), an edge is detected. Also, while an averaging filter is used as a spatial filter 2 (SF2), a "blurred" image is produced. Since there are large possibilities that a so-termed "jagy" is produced at a peripheral portion of an edge, a "blurred" image is used, and the original image is directly left at portions other than this edge portion. In accordance with this antialiasing method, only the edge portion is blurred, so that the effect of the antialiasing method may be achieved.

Forming of Projected Image

Figure 4A:
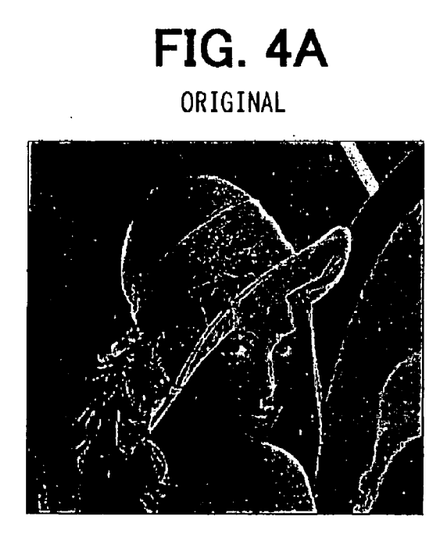
FIG. 4A to FIG. 4C are explanatory diagrams showing production examples of a projection image formed by the image processing apparatus of the embodiment.
Figure 4B:
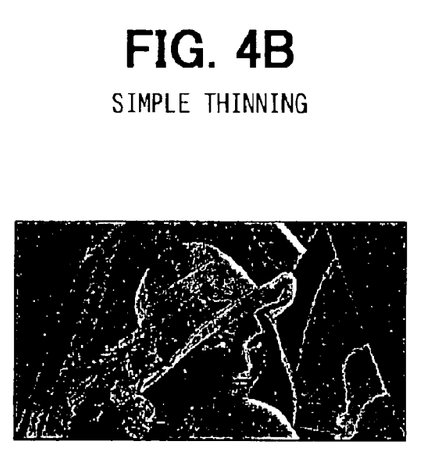
Figure 4C:
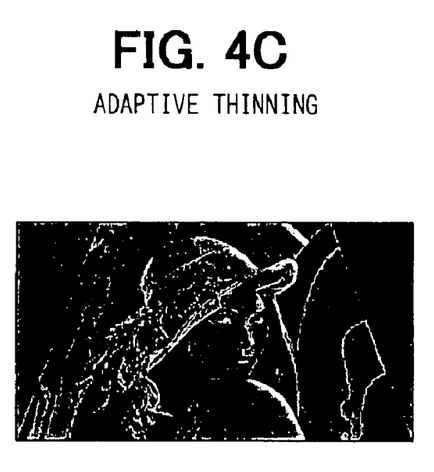

FIGS. 4A to 4C show a case that only data of required coordinate values are acquired by executing the coordinate calculation so as to produce an image. That is, an effect of an image projection can be achieved by merely thinning the image data. A perspective feeling may be furthermore increased in such a manner that while a thinning method is adaptively changed from a depth direction up to a forward direction, the thinning amount is further increased along the depth direction.

Quasi-Birds-Eye View

Figure 5:
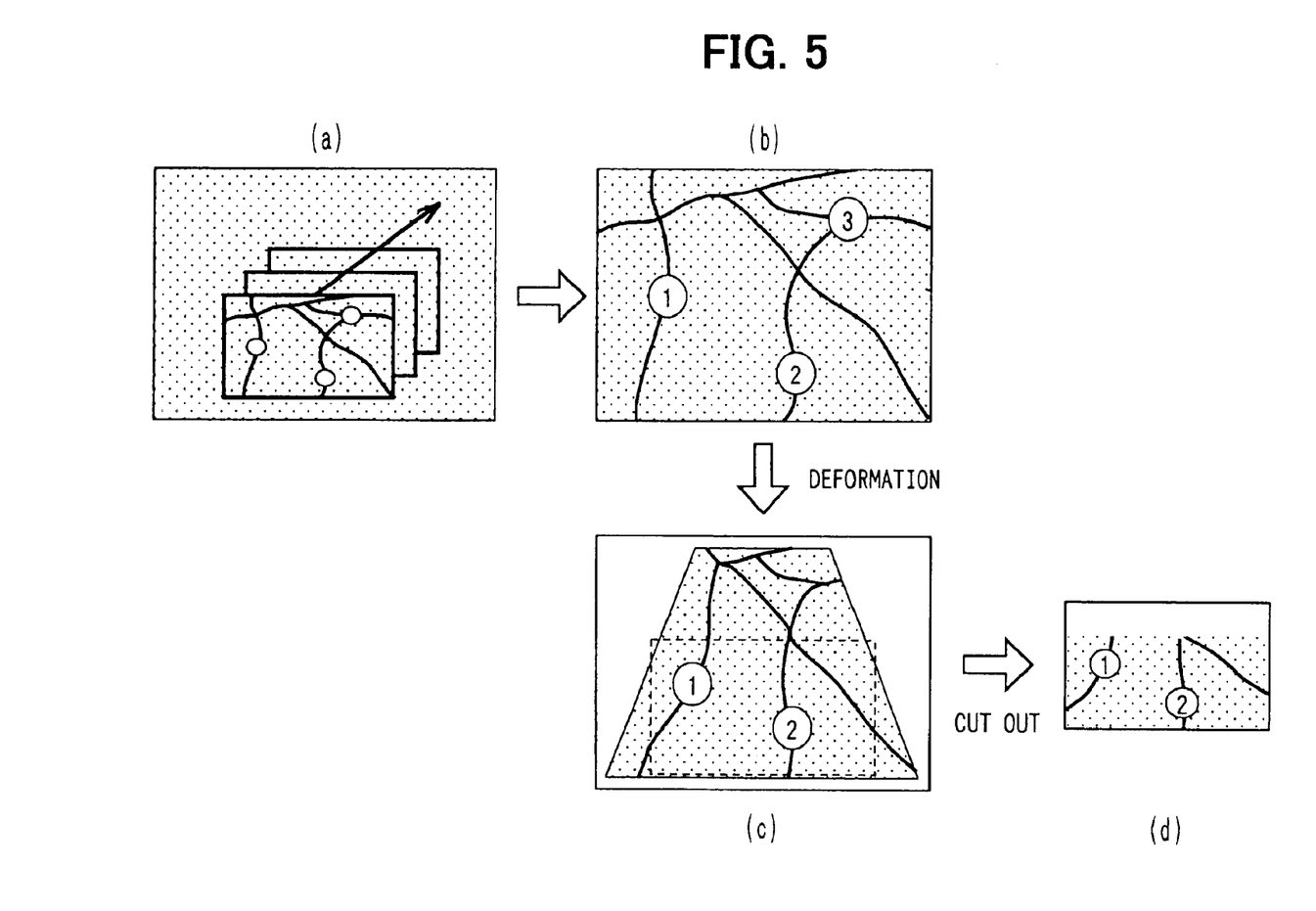
FIG. 5 is an explanatory diagram showing a scrolling operation of a birds-eye view formed by the image processing apparatus of the embodiment.

FIG. 5 indicates such a case that a quasi-birds-eye view is formed from a two-dimensional map image by employing a method of producing a projection image. While a two-dimensional map image may be scrolled by merely changing a readout position, a similar method to that of scrolling of the two-dimensional map image cannot be employed to scrolling of a birds-eye view. As a result, such a birds-eye view must be again drawn for every frame. To the contrary, in accordance with the arrangement of this embodiment, scrolling of the birds-eye view may be carried out by employing a similar method to that of scrolling of the two-dimensional map image, so that the birds-eye view can be displayed in the high-speed scrolling manner.

Specifically, an area larger than a display area is drawn by the drawing unit 11 similar to the case when the two-dimensional map image is scrolled ((a) in FIG. 5), and then the image data of the drawn area is stored in the memory 13. Then, in the case that a birds-eye view is formed, image data required to display the birds-eye view is read out from the memory 13, and then, a deformation processing operation is carried out with respect to this read image data so as to produce a birds-eye view in the display processing unit 15. Since a thinning processing operation is employed in the deformation processing operation, an image after being deformed becomes small. As a consequence, image data corresponding to a larger area is read out from the memory 13 ((b) in FIG. 5). Thereafter, the following modification processing operations 1 to 3 are carried out with respect to the read image data.

In the deformation processing operation 1, the readout image is compressed along a longitudinal direction by executing a thinning processing operation. In this case, the following thinning methods may be conceived. That is, for instance, the readout image may be thinned in a uniform manner. Alternatively, a thinning ratio of an upper portion of the readout image may be increased, whereas a thinning ratio of a lower portion of the read image may be decreased.

In the deformation processing operation 2, with respect to an image which has been compressed along the longitudinal direction, a thinning ratio from a lower portion to an upper portion of this image may be increased, so that a trapezoid-shaped image may be formed.

In the deformation processing operation 3, an area having a shape (rectangular shape in this case) corresponding to a figure of a display screen is cut out from the trapezoid-shaped image ((c) in FIG. 5).

In this embodiment, when this deformation processing operation is carried out, only image data required to be converted/displayed are thinned with respect to the image data read along the raster direction, and the thinned image data are directly outputted along the raster direction in the coordinate calculating unit 155. That is, while "image data are thinned along longitudinal direction", "image data are thinned along transverse direction", and also "necessary area is calculated", only image data which are finally required may be employed.

Then, since this cut image is synthesized with an object image of a sky, a quasi-birds-eye view may be formed ((d) in FIG. 5).

As a consequence, the two-dimensional map image stored in the memory 13 are sequentially read out by changing the readout positions thereof, and then, the readout two-dimensional map images are processed to form the above quasi-birds-eye view image. Thus, the quasi-birds-eye view image to be displayed can be formed at high speed, and can be scrolled in a smooth manner.

It should also be noted that in a birds-eye view image, in order to represent a perspective feeling, such a method may become effective in which a mist scene appears as long as a viewer goes. To this end, while employing the α blending function, a gradation image may be produced in which a map image can be clearly viewed in a lower portion of the screen, and a map image in the vicinity of the horizon within the birds-eye view appears blurred.

Others (1) When the image processing operation is carried out, the amount of data which are processed is relatively large, so that such an image processing operation may be carried out by executing a "pipeline processing operation." As a result, the display processing unit 15 is equipped with plural sets of raster buffers which correspond to cycles required to execute the image processing operations. One raster buffer is employed so as to process one image data. Then, while the image processing apparatus is arranged in such a manner that one image data can be outputted within a predetermined cycle by processing the image data in the pipeline manner, the synthesizing timing of the image data which is not processed may be preferably made coincident with the synthesizing timing of the data which has been processed.

(2) As previously described, since the processing/synthesizing processing operation is carried out by the display processing unit 15 with respect to the image data which are read out from the memory 13 along the raster direction, the rewriting operation of the image data into the memory 13 is no longer required which is needed in the related art. As a result, the image can be produced at the high speed. However, if the image is redrawn by the drawing unit 11, then the image having the high quality may be easily obtained. As a consequence, while the processing/synthesizing processing operation may be carried out by the display processing unit 15 only under such an image transition condition, the image data may be preferably redrawn by the drawing unit 11 under the normal condition, that is, not under such an image transition condition.

It should also be noted that when the display state under the transition mode is switched to the display state under the normal mode, or when the display state under the normal mode is switched to the display state under the transition mode, a sense of incongruity may occur in displayed images, because the images are different from each other between the normal mode and the transition mode. In order to avoid the occurrence of this incongruity sense, the α blending operation is executed by an α blending unit 154 of the display processing means. That is, in a case that the display mode is switched from the normal mode (drawn image is displayed) to the transition mode (image processed by display processing unit 15 is displayed), otherwise, the display mode is conversely switched from the normal mode to the transition mode, both the images obtained before/after the display mode is changed are processed by the α blending processing operation.

While one-screen data amount of image data is left in the memory 13, if the display mode is changed, then both the images which has been formed by executing the drawing operation (by drawing process block 11), or by the processing operation (by display processing unit 15) after the mode change, are processed by the α blending processing operation so as to smooth the transitions of the displayed images. As a result, it is possible to avoid the occurrence of such an incongruity sense during mode transitions.

In this case, the mode switching operation may be conceived based upon an externally-supplied signal. For example, it is so conceivable that the image processing apparatus of the above embodiment is applied to a navigation system. If so, then this image processing apparatus may determine whether the present operation mode corresponds to the normal mode, or the transition mode in response to an instruction signal supplied from a navigation control unit capable of controlling the entire system.

What is claimed is:

1. An image processing apparatus comprising:

drawing means for drawing an image;

storage means for storing therein the image drawn by the drawing means; and display processing means for reading image data from the storage means along a raster direction, and for executing a predetermined operation required for an image display with respect to the read image data to output an operated image data to a display device, the display processing means being configured to facilitate executing a processing operation including a coordinate calculation and a screen synthesizing processing with respect to the image data read out along the raster direction, wherein the display processing means executes, under a transition mode processing operation, both the processing operation and the screen synthesizing processing operation, to eliminate incongruity occurring upon switching of images on the display device, and wherein the display processing means executes, under a normal mode processing operation, the predetermined operation without executing at least the processing operation.

2. The image processing apparatus as in claim 1, wherein, in a case that the processing operation in a transition mode and the processing operation in a normal mode are switched, the display processing means performs an αblending processing as the screen synthesizing processing with respect to both images which are to be displayed.

3. The image processing apparatus as in claim 1, wherein the display processing means outputs processed/synthesized image data to the display device and also the storage means, and the storage means stores therein the image data after being processed/synthesized.

4. The image processing apparatus as in claim 1, wherein:

the drawing means draws an image which is represented by a color palette system, and the image represented by the color palette system is stored in the storage means; and the display processing means converts the image data which is read out from the storage means along the raster direction from color palette data into RGB data, and thereafter executes both the predetermined operation and the screen synthesizing processing operation with respect to the RGB data.

5. The image processing apparatus as in claim 1, wherein:

the display processing means includes a buffer means having a smaller storage capacity than an image storage size of the image drawn by the drawing means;

the display processing means reads the image date from the storage means in a raster sequence required for the image display, and also reads data around the image data required for the image display to store the read data into the buffer means; and the display processing means executes the processing operation by employing both the image data and the data around the image data.

6. The image processing apparatus as in claim 5, wherein the buffer means is configured to facilitate storing therein image data which are required to display several lines of images.

7. The image processing apparatus as in claim 1, wherein the display processing means includes:
- an image processing unit;
- an image synthesizing unit;
- a demultiplexer configured to facilitate demultiplexing inputs to both the image processing unit and the image synthesizing unit; and
- a multiplexer configured to facilitate selecting outputs from both the image processing unit and the image synthesizing unit,
- wherein an output derived from the multiplexer is again applied to the demultiplexer.

8. The image processing apparatus as in claim 7, wherein the image synthesizing unit of the display processing means has a blending function of plural images based upon an equation defined as an output pixel value=first image data value×blending coefficient+second image data value ×(1−blending coefficient).

9. The image processing apparatus as in claim 1, wherein:
- the display processing means has plural sets of buffer means configured to facilitate processing one image data;
- the display processing means executes a pipeline processing operation so that one image data can be outputted with a predetermined cycle; and
- synthesizing timing of image data which is not processed is made coincident with synthesizing timing of image data which has been processed.

10. The image processing apparatus as in claim 1, wherein the display processing means is configured to facilitate executing each of a spatial filtering function, a coordinate calculating function and a blending function, and executes a processing operation by combining the three with each other.

11. The image processing apparatus as in claim 10, wherein the display processing means moves an object image, and represents/deletes the object image by employing both the coordinate calculating function and the blending function.

12. The image processing apparatus as in claim 10, wherein, while the display processing means uses the coordinate calculating function, the display processing means compresses an image by selecting image data which is read out from the storage means.

13. The image processing apparatus as in claim 10, wherein the display processing means further has a down-sampling function, and compresses an image so that the image data which are sequentially read out from the storage means are thinned at a predetermined rate.

14. The image processing apparatus as in claim 10, wherein, while the display processing means employs the spatial filter function, the display processing means compresses an image by applying an averaging filter to the image data read out from the storage means.

15. The image processing apparatus as in claim 10, wherein the display processing means further has an up-sampling function, and enlarges an image so that a zero-th hold processing operation is carried out with respect to the image data which are sequentially read out from the storage means, while the same data are inserted into the read image data in a predetermined ratio in the zero-th hold processing operation.

16. The image processing apparatus as in claim 10, wherein, while the display processing means employs the spatial filtering function, the display processing means enlarges an image by changing a spatial filter coefficient applied to the image data read out from the storage means.

17. The image processing apparatus as in claim 10, wherein:
- while the display processing means employs the spatial filtering function, the display processing means applies a differential type filter with respect to the image data read out from the storage means so as to extract an edge thereof, and further applies thereto an averaging filter to obtain a blurred image; and
- the display processing means executes a processing operation configured to facilitate achieving an anti-aliasing effect by synthesizing the blurred image with the relevant image which is not processed by using the information as to the extracted edge.

18. The image processing apparatus as in claim 10, wherein, while the display processing means employs the coordinate calculating function, the display processing means aquires a projection image by thinning the image data which are read out from the storage means.

19. The image processing apparatus as in claim 18, wherein the display processing means determines a thinning ratio based upon a projection angle of the image, and furthermore increases an effect of a perspective feeling by adaptively changing thinning ratios on the close side to a view point and the far side to the view point.

20. An image processing apparatus as in claim 1, wherein, while a two-dimensional map image is stored into the storage means, the display processing means forms an image having a perspective feeling by projecting the two-dimensional map image read out from the storage means, and then produces a quasi-birds-eye view in such a manner that a portion of the image having the perspective feeling is cut out, and the cut-out image portion is synthesized with an object image indicative of a sky.

21. The image processing apparatus as in claim 20, wherein:
- the drawing means draws the two-dimensional map image having an area which is wider than a display area to be displayed on the display device, and then stores the drawn two-dimensional map image in the storage means; and
- the display processing means sequentially reads out a portion of the two-dimensional map image stored in the storage means by changing a readout position thereof, forms an image having a perspective feeling by projecting each of the readout images, and executes a scrolling display processing operation of the quasi-birds-eye view in such a manner that a portion of the projection image is cut out, and the projection image portion is synthesized with the object image of the sky.

22. A program which causes a computer to execute a function of the image processing apparatus as recited in claim 1.

23. An image processing apparatus comprising:
- drawing means for drawing an image;
- storage means for storing therein the image drawn by the drawing means; and
- display processing means for reading image data from the storage means along a raster direction, and for executing a predetermined operation required for an image display with respect to the read image data to output an operated image data to a display device,
- the display processing means being configured to facilitate executing a processing operation including a coordinate calculation and a screen synthesizing processing with respect to the image data read out along the raster direction, wherein the display processing means includes:
an image processing unit;
an image synthesizing unit;
a demultiplexer configured to facilitate demultiplexing inputs to both the image processing unit and the image synthesizing unit; and
a multiplexer configured to facilitate selecting outputs from both the image processing unit and the image synthesizing unit,
wherein an output derived from the multiplexer is again applied to the demultiplexer; and
wherein the image synthesizing unit of the display processing means has a blending function of plural images based upon an equation defined as an output pixel value=first image data value×blending coefficient+ second image data value ×(1−blinding coefficient).

24. An image processing apparatus comprising:
drawing means for drawing an image;
storage means for storing therein the image drawn by the drawing means; and
display processing means for reading image data from the storage means along a raster direction, and for executing a predetermined operation required for an image display with respect to the read image data to output an operated image data to a display device,
the display processing means being configured to facilitate executing a processing operation including a coordinate calculation and a screen synthesizing processing with respect to the image data read out along the raster direction;
wherein the display processing means has plural sets of buffer means configured to facilitate processing one image data;
the display processing means executes a pipeline processing operation so that one image data can be outputted with a predetermined cycle; and
synthesizing timing of image data which is not processed is made coincident with synthesizing timing of image data which has been processed.

25. An image processing apparatus comprising:
drawing means for drawing an image;
storage means for storing therein the image drawn by the drawing means; and
display processing means for reading image data from the storage means along a raster direction, and for executing a predetermined operation required for an image display with respect to the read image data to output an operated image data to a display device,
the display processing means being configured to facilitate executing a processing operation including a coordinate calculation and a screen synthesizing processing with respect to the image data read out along the raster direction;
wherein the display processing means is configured to facilitate executing each of a spatial filtering function, a coordinate calculating function and a blending function, and executes a processing operation by combining the three functions with each other; and
wherein the display processing means further has an up-sampling function, and enlarges an image so that a zero-th hold processing operation is carried out with respect to the image data which are sequentially read out from the storage means, while the same data are inserted into the read image data in a predetermined ratio in the zero-th hold processing operation.

26. An image processing apparatus comprising:
drawing means for drawing an image;
storage means for storing therein the image drawn by the drawing means; and
display processing means for reading image data from the storage means along a raster direction, and for executing a predetermined operation required for an image display with respect to the read image data to output an operated image data to a display device,
the display processing means being configured to facilitate executing a processing operation including a coordinate calculation and a screen synthesizing processing with respect to the image data read out along the raster direction
wherein the display processing means is configured to facilitate executing each of a spatial filtering function, a coordinate calculating function and a blending function, and executes a processing operation by combining the three functions with each other; and
wherein, while the display processing means employs the spatial flitering function, the display processing means applies a differential type filter with respect to the image data read out from the storage means so as to extract an edge thereof, and further applies thereto an average filter to obtain a blurred image; and
wherein the display processing means executes a processing operation configured to facilitate achieving an antialiasing effect by synthesizing the blurred image with the relevant image which is not processed by using the information as to the extracted edge.

27. An image processing apparatus comprising:
drawing means for drawing an image;
storage means for storing therein the image drawn by the drawing means; and
display processing means for reading image data from the storage means along a raster direction, and for executing a predetermined operation required for an image display with respect to the read image data to output an operated image data to a display device,
the display processing means being configured to facilitate executing a processing operation including a coordinate calculation and a screen synthesizing processing with respect to the image data read out along the raster direction;
wherein the display processing means is configured to facilitate executing each of a spatial filtering function, a coordinate calculating function and a blending function, and executes a processing operation by combining the three functions with each other;
wherein, while the display processing means employs the coordinate calculating function, the display processing means acquires a projection image by thinning the image data which are read out from the storage means; and
wherein the display processing means determines a thinning ratio based upon a projection angle of the image, and furthermore increases an effect of a perspective feeling by adaptively changing thinning ratios on the close side to a view point and the far side to the view point.

* * * * *